United States Patent [19]
Brown et al.

[11] 3,890,446
[45] June 17, 1975

[54] CERTAIN DIGUANIDINO COMPOUNDS USED AS FUNGICIDES

[75] Inventors: John Graham Brown, Ware; Henry Arthur Sheldon Payne, Ampthill, both of England

[73] Assignee: Murphy Chemical Ltd., Wheathampstead, St. Albans, Hertfordshire, England

[22] Filed: Dec. 21, 1973

[21] Appl. No.: 427,141

Related U.S. Application Data

[63] Continuation of Ser. No. 245,189, April 18, 1972, abandoned.

[30] Foreign Application Priority Data

Apr. 21, 1971 United Kingdom............... 10567/71

[52] U.S. Cl. ............................................... 424/326
[51] Int. Cl.² .......................................... A01N 9/20
[58] Field of Search ..................................... 424/326

[56] References Cited
UNITED STATES PATENTS

| | | | |
|---|---|---|---|
| 3,113,151 | 12/1963 | McKay et al. ................. | 424/326 X |
| 3,152,181 | 10/1964 | Shapiro et al. ................. | 424/326 X |
| 3,157,695 | 11/1964 | Lafont et al. ................... | 424/326 X |
| 3,436,461 | 4/1969 | Scotti ............................. | 424/326 X |
| 3,468,898 | 9/1969 | Cutler et al. .................... | 424/326 X |
| 3,479,437 | 11/1969 | Szapo et al. .................... | 424/326 X |
| 3,639,631 | 2/1972 | Badcock et al. ................. | 424/326 |

OTHER PUBLICATIONS

Chemical Abstracts, 58:7263g, (1963).

Chemical Abstracts, 59:3770b, (1963).

Primary Examiner—Albert T. Meyers
Assistant Examiner—Leonard Schenkman
Attorney, Agent, or Firm—Bacon & Thomas

[57] ABSTRACT

A method for the control of fungal infection in plants comprises applying, e.g. as a seed dressing, a compound selected from 1,8-diguanidino-octane, 1,9-diguanidino-nonane, 1,10-diguanidino-decane, and salts thereof.

6 Claims, No Drawings

CERTAIN DIGUANIDINO COMPOUNDS USED AS FUNGICIDES

This is a continuation of application Ser. No. 245,189, filed Apr. 18, 1972, now abandoned.

The invention concerns improvements in pesticides. More particularly, the invention concerns a novel method of controlling fungal infection in plants.

It is well known that plants are subject to attack by a large number of pathogenic fungi, which cause considerable economic losses and sometimes result in the destruction of an entire crop. Such fungal infections can be efficiently controlled by organomercury compounds, but it has now been realised that the widespread use of such compounds is not always desirable. Even when organo-mercury compounds are selected which have a relatively low mammalian toxicity, these compounds may subsequently be degraded into compounds which are considerably more toxic to mammals, and furthermore such compounds are cumulative toxicants in mammals.

There is therefore a need for a process for controlling fungal infection in plants which does not employ organo-mercury compounds. We have now found that certain guanidino compounds can be efficiently employed for this purpose.

According to one aspect of the present invention, therefore, there is provided a method for the control of fungal infection in plants which comprises applying to said plants an effective amount of a compound of general formula:

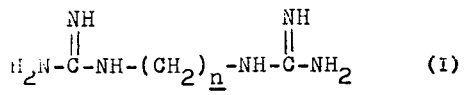

(I)

wherein $n$ represents 8, 9 or 10, or an acid-addition salt thereof.

Compounds of particular interest are 1, 8-diguanidino-octane and its salts and 1, 10-diguanidinodecane and its salts. The compounds are of particular interest for the control of *Piricularia oryzae* (rice blast). This fungus represents a serious problem in rice-growing countries, particularly Japan.

The former compound has also shown in vitro activity against *Fusarium culmorum*, *F. nivale*, *Septoria nodorum*, *Phoma betae*, *Ophiobolus graminis*, *Candida albicans* and *Rhizoctonia solani*.

The compounds may be applied directly to the plants (the term "plant" being used herein to include seeds). A preferred mode of application is as a seed dressing.

In certain cases the compounds may show fungicidal activity when applied to the plants via the soil; for example systemic activity against rice blast has been observed when the compounds were applied to the soil as a drench.

Suitable rates of application may readily be found by experiment. For use as a seed dressing, the rate of application may be, for example, 0.5 – 10g/kg of seed, preferably 1 – 4g/kg of seed. When the application is to emerged plants or directly to the soil, the rate of application will generally lie within the range 0.05 to 10 kg/ha active ingredient, but preferably 0.5 – 5.0 kg/ha.

If the compounds are applied before fungal attack, they are effective to prevent or inhibit such attack. If they are applied after fungal attack, they can be of value in preventing the infection from spreading, and even eradicating it if the infection has not progressed too far.

The compound of general formula I will generally be employed in admixture with a carrier or diluent. Therefore a further feature of the present invention provides a fungicidal composition suitable for application to plants comprising a fungicidally-effective amount of a compound of general formula I or an acid-addition salt thereof in association with a carrier or diluent.

Such carriers may be liquid or solid and designed to aid the application of the compound either by way of dispersing it where it is to be applied or to provide a formulation which can be made by the user into a dispersible preparation.

Liquid preparations thus include preparations of the compound in the form of solutions or emulsions which can be used on their own or be adapted to be made up with water or other diluents to form sprays etc; in such cases the carrier is a solvent or emulsion base non-phytotoxic under the conditions of use. Generally such preparations would include a wetting, dispersing or emulsifying agent. Other liquid preparations include aerosols in which the compound is associated with a liquid carrier or propellent.

Solid preparations include dusts and wettable powders, granulates and pellets, and semi-solid preparations such as pastes. Such preparations may include inert solid or liquid diluents such as clays, which may themselves have wetting properties and/or wetting, dispersing or emulsifying agents; binding and/or adhesive agents may also be included.

One type of composition comprises seed dressings. The proportion of compound of general formula I in the dressing may for example be 10 – 80% by weight, preferably 25 – 50% by weight.

The carrier or diluent may be solid e.g. china clay or talc. A surface active agent may be included, with or without additional solid carrier or diluent, when the dressing is to be applied in a moistened state. A further desirable ingredient of the composition is a pigment, e.g. iron oxide or an organic colouring material. A pigment such as iron oxide suitably comprises about 5% of the dressing, but an organic pigment may often be used in smaller amount. Such pigment enables dressed seed to be distinguished from undressed seed, and also enables a check to be made on the evenness of the dressing.

The dressing may include minor proportions of other components, e.g. a "sticker" to increase adherence of the dressing to the seed. A suitable "sticker" is petroleum oil of medium viscosity, which may comprise about 2% of the composition. A further component may be added to improve the flow properties of the dressing, e.g. about 1% of magnesium stearate or about 2% of kieselguhr.

The active components should be finely ground, preferably to a particle size of less than 30 microns, when they are used in solid compositions.

Solid compositions according to the invention may be used in the encapsulation or pelleting of seed.

Seed dressing compositions according to the invention may also be used as a liquid in solution or dispersion form in a non-phytotoxic liquid medium e.g. water or a non-phytotoxic organic solvent, to enable the seed to be impregnated or coated with the active ingredients. Such liquids may also contain colouring agents and/or stickers as described above.

Dressings according to the invention are suitable inter alia for use on wheat, barley and oats.

The fungicidal compositions of this invention may if desired contain one or more additional fungicidally active compounds. For example seed dressings may include the fungicide 5,6-dihydro-2-methyl-1,4-oxathiin-3-carboxanilide disclosed and claimed in British Patent 1,099,242.

The compounds of general formula I are conveniently employed as their acid-addition salts, which preferably are water-soluble.

The salts may be formed with either inorganic or organic acids. Thus suitable salts include the hydrochloride, carbonate, sulphate, nitrate, acetate, formate, benzoate, hydrogen oxalate, oxalate, fumarate, chloroacetate, maleate, succinate, citrate and trichloroacetate. The salts of particular interest are the bis salts as for example those salts formed by the reaction of two molecules of a monobasic acid with one molecule of the diguanidino compound, or from one molecule of a dibasic acid with one molecule of the diguanidino compound. Sesqui salts may be formed from the dibasic acids. The diacetate, fumarate, bis-chloroacetate, dibenzoate, maleate, succinate, bis-trichloroacetate and carbonate salts are novel per se, and also form part of the present invention.

The above-mentioned novel salts of the compounds of general formula I may be prepared in any desired way, for example by passing a solution of another salt, for example the sulphate or dihydrochloride through an anion exchange resin in e.g. the carbonate or acetate form. Alternatively, the salts can be prepared by double decomposition between another salt of the compound I for example the sulphate or dihydrochloride, and a soluble salt containing the required anion, for example an alkali metal (preferably sodium) salt, e.g. the carbonate or acetate.

Alternatively, the novel salts can be made by direct combination between the free base and the corresponding acid (although this method is less suitable for preparing the carbonate). The novel salts may also be prepared by reaction between the carbonate of compound I and the corresponding acid.

The compounds of general formula I may be prepared in known manner by reacting a compound of general formula $H_2N(CH_2)_nNH_2$ (wherein $n = 8, 9$ or 10) with an S-alkyl isothiouronium salt, for example the sulphate (Bischoff et al., J. Biol. Chem. 1928, 80, 345).

Instead of the isothiouronium salt, the corresponding isouronium salt may be employed. This has the advantage that an alkanol is produced as a byproduct, instead of an alkyl mercaptan.

Also the diamine can be converted directly to the bis-guanide salt by reaction with calcium cyanamide in the presence of an acid. Other guanidating agents can be used such as guanidine thiocyanate.

In order that the invention may be better understood, the following Examples are given by way of illustration only. All percentages are by weight and temperatures are in °C.

EXAMPLE 1

Compounds of the general formula I (as their dihydrochlorides) were tested for activity against *Piricularia oryzae* by a zone inhibition technique.

Agar containing pencillin G (5 ppm) was inoculated with *P. oryzae* and allowed to set on plates. The agar plates were punched with small holes in a square design, and solutions of the compounds to be tested were pipetted at the rate of two drops into each hole. The compounds were tested as aqueous solutions at concentrations of 200 ppm and 20 ppm.

The plates were then incubated at 26°C for 24 hours. After this incubation period, the agar had become opaque except in a circular zone round the holes containing the compounds showing antifungal activity. Such zones showed a haziness, but were clearly distinguishable from the opaque background.

The results are shown in Table 1 below.

| Dihydrochloride of compound of formula 1, $n=$ | Size of inhibition zone, mm | |
|---|---|---|
| | 200 ppm | 20 ppm |
| 8 | 33.1 | 20.1 |
| 10 | 18.9 | 14.0 |

EXAMPLE 2

The compound 1,8-diguanidino-octane dihydrochloride was tested by the method of Example 1 for activity against a variety of common plant pathogenic fungi. The compound was tested at 200 ppm and 20 ppm, and the sizes of the inhibition zones observed are shown in Table 2 below.

| Fungus | Size of inhibition, mm | |
|---|---|---|
| | 200 ppm | 20 ppm |
| Fusarium culmorum | 26.9 | 24.8 H |
| F. nivale | 22.3 | 0 |
| Ophiobolus graminis | 32.5 | 19.9 H |
| Candida albicans | 23.3 H | 15.7 |
| Rhizoctonia solani | 12.8 | 0 |

"H" indicates that the zone of inhibition was hazy.

EXAMPLE 3

1,8-Diguanidino-octane dihydrochloride was tested for activity against *Venturia inaequalis* (apple scab) by a spore germination test.

The compound to be tested was dissolved in water to give concentrations of 40, 20, 10 and 5 ppm. Three replicate drops of 0.2 ml from each concentration were placed separately on the microscope slides and allowed to dry.

A spore suspension containing one hundred thousand spores per ml of *Venturia inaequalis* suspended in distilled water was added, at the rate of 0.2 ml, to each point of treatment. The slides so prepared were placed in petri dishes lined with damp filter paper.

After incubation for 20 hours at room temperature, the slides were examined microscopically, and the percentage of germinated spores was noted.

The results are shown in Table 3 below.

| Concentration (ppm) | % germination |
|---|---|
| 40 | 2 |
| 20 | 20 |

-Continued

| Concentration (ppm) | % germination |
|---|---|
| 10 | 13 |
| 5 | 23 |
| 0 (control) | 42 |

When a similar test was performed with 1,8-diguanidino-octane sulphate using *Piricularia oryzae* spores, 8% of spores germinated in the presence of 100 ppm of toxicant and 19% germinated in the presence of 25 ppm of toxicant. 66% of spores in the untreated control germinated.

EXAMPLE 4

1,8-Diguanidino-octane carbonate

A solution of 1,8-diguanidino-octane sulphate (10g) in water (80 ml) was heated on a steam bath and filtered hot into a 250 ml flask through a sintered funnel. The funnel was washed with a little water and a hot solution of anhydrous sodium carbonate (15 g) in water (40 ml) was filtered through the funnel into the same flask. A precipitate formed on cooling.

The mixture was allowed to cool in an ice-bath and the colourless solid obtained was collected, washed with alcohol and dried in a vacuum oven.

The yield of colourless crystals (m.p. 172°–175°) was quantitative. The crude product could be recrystallised from water as colourless needles.

EXAMPLE 5

1,8-Diguanidino-octane diacetate

A. 1,8-Diguanidino-octane carbonate, prepared as in Example 4 (5.48 g; 20 mmole), was treated with glacial acetic acid (2.4 g; 40 mmole) and water (5 ml). There was vigorous effervescence. The mixture was warmed gently on a steam bath for five minutes. The solid did not dissolve completely and more acetic acid (5 ml) and water (20 ml) were added. After warming for two minutes the last traces of solid dissolved and the solution was filtered through a sintered funnel. Addition of acetone (50 ml) precipitated the acetate as a colourless solid. The solid was collected, washed with a small volume of acetone and air dried. A sample was recrystallised by dissolving in acetic acid and precipitating with acetone to give colourless needles of the title compound (m.p. 202°–205°). Yield of unrecrystallised material (5 g) was 72%. The solubility in water at 25° was 12.5 weight %. (Found: N, 23.1; $C_{14}H_{32}N_6O_4.H_2O$ requires N, 23.0%).

B. 1,8-Diguanidino-octane carbonate prepared as in Example 4 (29.0 g) was added to a stirred solution of acetic acid (18 ml; 50% excess) in water (30 ml.) at room temperature. After stirring for 1½ hours, the mixture was heated on a steam bath until almost all the solid had dissolved when it was filtered through a sintered-glass funnel. A precipitate of the title compound formed on cooling and was filtered off when cold. Further chilling yielded a second crop of the title compound. The solid was sucked dry and dried in the oven.

The total yield of unrecrystallised product was 32 g (98%). The solid was recrystallised from hot water (70 ml.) adding acetone (300 ml.) to complete the precipitation. The recrystallised material melted at 208°–209°.

C. 1,8-Diamino-octane (14.4 g; 0.1 mole), cyanamide (8.4 g; 0.2 mole) and acetic acid (6.1 g) were dissolved in absolute ethanol (50 ml) and heated under reflux for 31 hours. Ethanol was then removed by evaporation on a rotary evaporator and the residue treated with acetone-water (1:4) (350 ml). The precipitated solid (11.7 g) was collected and dried. It melted at 194°–6°.

Recrystallisation from aqueous acetone gave the title compound as a colourless solid (m.p. 202°–203°) with an infra red spectrum identical to that of an authentic sample.

EXAMPLE 6

Fumarate, bis-chloroacetate, dibenzoate, maleate, succinate and bis-trichloroacetate salts of 1,8-diguanidino-octane These salts were prepared by the following general method:

1,8-Diguanidino-octane carbonate (prepared as in Example 4) was added portionwise with stirring at room temperature to an aqueous solution of the required acid (10% excess). When the addition was complete, the mixture was stirred for a further 30–60 minutes on a hot water bath or steam bath. After cooling, the mixture was chilled and filtered and the collected solid washed with a little cold water and acetone. The product was recrystallised from water and dried in an oven at 70°.

Most of the salts were hydrates with low solubility in water. Their properties were as follows:

TABLE 4

| Salt of 1,8-diguanido-octane | m.p. (°C) | Yield % (unrecrystallised) | Analysis %N Found | Analysis %N Required | Approx. solubility in water at 25° (weight %) |
|---|---|---|---|---|---|
| Fumarate | 299–301 | 100 | 23.4 | 23.2 (monohydrate) | <1 |
| Bis-chloroacetate | 130–131 | 61.5 | 19.6 | 19.4 | 6 |
| Dibenzoate | 182–183 | 49.5 | 17.1 | 17.15 (monohydrate) | 1 |
| Maleate | 221–222 | 98 | 21.8 | 22.0 (dihydrate) | <1 |
| Succinate | 278–280 | 97 | 21.9 | 22.0 (dihydrate) | <1 |
| Bis-trichloroacetate | 142–143 | 98 | 15.4 | 15.3 | 1 |

EXAMPLE 6

1,8-Diguanidino-octane as salts thereof was tested for its ability to protect broad beans against rust (*Uromyces fabae*).

The test compounds were applied as a spray containing 200 ppm of toxicant. Both leaf surfaces of the plants were wetted until run-off occurred. After the plants had dried they were inoculated by blowing dry spores over them from infected bean leaves. The plants were then kept at about 100% relative humidity for 24 hours before being transferred to a greenhouse. The percentage protection afforded by each treatment, compared with an untreated control, was assessed after 7–8 days. No phytotoxicity was observed.

For comparison purposes, maneb was also tested (at 50 ppm of toxicant).

The results are shown in Table 5 below.

| Compound:salt of 1,8-diguanidino-octane | % Protection |
|---|---|
| Sulphate | 84 |
| Carbonate | 69 |
| Acetate | 87 |
| Hydrochloride | 89 |
| Control | |
| Maneb | 94 |

At 300 ppm, the sulphate gave 97% protection.

EXAMPLE 7

1,8-Diguanidino-octane as salts thereof was tested for its ability to protect broad beans against chocolate spot (*Botrytis fabae*).

The test compound was applied as a spray containing 300, 100, 30 or 10 ppm of active ingredient. Both leaf surfaces were treated.

After the plants had dried, discs were cut from the leaves and placed on moist filter paper in petri dishes. The discs were inoculated by spraying them with a suspension of spores of *Botrytis fabae* in a nutrient solution (sucrose/citrate).

Fungal attack was assessed after 24 hours and the % control calculated. Dichlofluanid at 10 ppm was employed as a comparison compound. The results are shown in Table 6.

TABLE 6

| Salt of 1,8-diguanidino-octane | % protection at 300 | 100 | 30 | 10 ppm | % protection by dichlofluanid |
|---|---|---|---|---|---|
| sulphate | 100 | 100 | — | 65 | 90 |
| carbonate | 92 | 74 | 65 | — | 79 |
| dibenzoate | — | 84 | 70 | — | 79 |

EXAMPLE 8

The sulphate, carbonate and diacetate of 1,8-diguanidino-octane were tested as seed dressings on wheat infected with *Septoria nodorum*.

The experimental materials were each formulated as a slurry containing 50% of active ingredient together with an inert carrier and the minimum quantity of a suitable wetting agent. This slurry was applied to wheat known to contain a high proportion of natural fungal infection. The rate of application was 2g/kg of seed.

As a standard for comparison, another sample of wheat was treated with 2g/kg of an organomercurial dressing containing 1% of active ingredient. Untreated seed was also tested to give a measure of the infection rate.

The prepared seeds were sown in calcined china clay contained in small plastic trays and germinated in a growth room under controlled conditions of water, light and temperature.

About three weeks after sowing, when the seedlings were 7.5 – 10 cm high, they were removed from the trays and classified into diseased and healthy. The % germination was also assessed.

The results are shown in Table 7.

TABLE 7

| Salt of 1,8-diguanidino-octane | % germination | % healthy |
|---|---|---|
| sulphate | 90 | 67 |
| carbonate | 94 | 72 |
| acetate | 91 | 66 |
| Organo-mercurial dressing | 93 | 53 |
| Untreated | 89 | 52 |

We claim:
1. A method of preventing fungal infection in plants, and seeds, which comprises applying to the plants 0.05 to 10 kg/ha and to the seeds 0.5 to 10 g/kg of seed a compound selected from the group consisting of a compound of the formula:

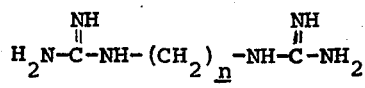

and an acid addition salt thereof, wherein *n* is the integer 8, 9, or 10.

2. The method of claim 1, wherein *n* is 8.

3. The method of claim 2 wherein said compound is selected from the group consisting of the dihydrochloride, carbonate, sulphate, dinitrate, diacetate, dibenzoate, fumarate, bis-chloroacetate, maleate, bis-trichloroacetate and succinate of 1,8-diguanidino-octane.

4. The method of claim 2 wherein said compound is applied to the seed at the rate of 1–4 g per kg of seed.

5. The method of claim 2 wherein said compound is applied to plants at the rate of 0.5 – 5.0 kg/ha.

6. The method of claim 2 wherein said fungal infection is caused by *Piricularia oryzae* and said plants are rice.

* * * * *